United States Patent [19]
Quemin et al.

[11] Patent Number: 5,653,159
[45] Date of Patent: Aug. 5, 1997

[54] GAS BARBECUE WITH VARIABLE COOKING

[75] Inventors: Andre Quemin; Georges Le Strat, both of Neuilly Sur Seine, Cedex, France

[73] Assignee: Shell Research Limited, London, United Kingdom

[21] Appl. No.: 632,445

[22] PCT Filed: Oct. 13, 1994

[86] PCT No.: PCT/EP94/03396

§ 371 Date: Apr. 15, 1996

§ 102(e) Date: Apr. 15, 1996

[87] PCT Pub. No.: WO95/10214

PCT Pub. Date: Apr. 20, 1995

[30] Foreign Application Priority Data

Oct. 15, 1993 [FR] France ................... 93 12278

[51] Int. Cl.⁶ ............................................. A47J 37/00
[52] U.S. Cl. ................... 99/340; 99/400; 99/401; 99/444; 99/447; 126/9 R; 126/25 R; 126/41 R
[58] Field of Search ................... 99/339, 340, 421 H, 99/421 V, 419, 400, 401, 447, 449, 450, 422, 482, 444–446; 126/41 R, 41 B, 41 D, 19 R, 25 R, 25 A, 9 R

[56] References Cited

U.S. PATENT DOCUMENTS

| 3,757,765 | 9/1973 | Yamada | 126/25 R |
|---|---|---|---|
| 4,607,609 | 8/1986 | Keating | 99/422 X |
| 4,627,410 | 12/1986 | Jung | 99/339 X |
| 5,078,121 | 1/1992 | Ha | 99/447 |
| 5,129,312 | 7/1992 | Berger | 99/340 |

*Primary Examiner*—Timothy F. Simone

[57] ABSTRACT

The barbecue comprises a gridiron (3) and cooking means (10,11,12) arranged laterally below said gridiron. These cooking means comprise a blue flame gas burner (10), as well as a radiant grille (12) and a deflector flap (11) which are movable with respect to the burner (10). Adjustment of the position of the flap (11) and the grille (12) with respect to the burner (10) allows the cooking mode (convection/radiation) to be varied.

20 Claims, 2 Drawing Sheets

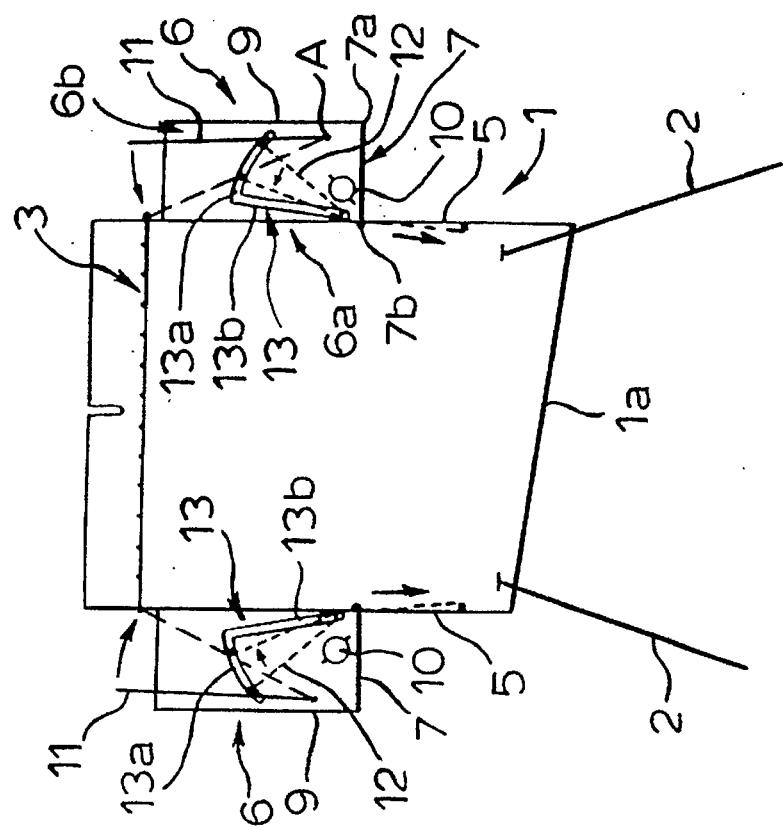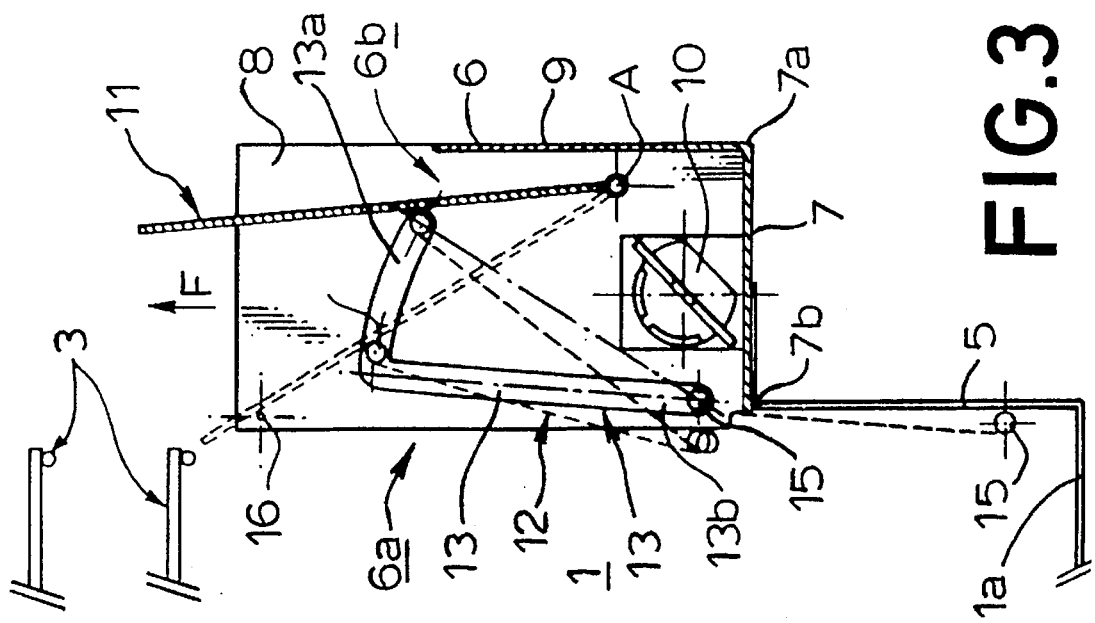

5,653,159

GAS BARBECUE WITH VARIABLE COOKING

FIELD OF THE INVENTION

The present invention relates to a gas barbecue.

BACKGROUND OF THE INVENTION

For several years, efforts have been directed to finding a replacement for traditional wood- or charcoal-burning barbecues. Such barbecues are toxic for certain foods. Fat, for example from meat, drips during cooking onto the wood or charcoal fuel, where it is pyrolized to form—among other products—carcinogenic polyaromatics, such as benzopyrene A.

To overcome these drawbacks, barbecues have been proposed with vertical roasting. The meat (or any other food) is held vertically between two grids, the roasting being performed by two radiant heat sources arranged on either side of the grids.

Barbecues have also been proposed with overhead heating, i.e. the heat source being located above the food, which is cooked solely by radiation.

With such vertical or overhead barbecues, the fat does not drip onto the heat source(s), but into a cold zone and so does not decompose.

Nevertheless, these various barbecues look very different from conventional barbecues and are not considered by users as equivalent to traditional barbecues.

More recently, to overcome this disadvantage, a barbecue has been proposed comprising two radiant gas burners arranged laterally on either side and below a horizontal food support. The fat drips between the heat sources without decomposing. Furthermore, in operation such a barbecue has a similar appearance to a traditional barbecue.

This barbecue, however, has the drawback of not allowing deep cooking of foods. It only allows searing of the surface, whereas some foods, such as white meat and vegetables, need to be cooked deeply and evenly.

OBJECTS AND SUMMARY OF THE INVENTION

An aim of the present invention is to provide a barbecue which, while providing a more healthy cooking than that provided by traditional barbecues, allows the user to choose the type of cooking (deep or surface cooking) to be performed.

It is an object of the invention to provide a barbecue of the type comprising, on the one hand, a gridiron adapted to receive the food to be cooked, and, on the other hand, means for cooking the food. These cooking means are of the gas burner type. They comprise at least one radiant element, which is arranged laterally relative to a fat dripping zone. This radiant element is oriented such as to radiate towards the gridiron.

According to the invention, this barbecue is characterized in that the cooking means comprise at least one gas burner, as well as at least one deflection member for guiding the combustion fumes emitted by the gas burner, the gas burner and/or the radiant element being movable between a first relative position where they are opposite each other and where the radiant element is active and a second position where the radiant element is remote from the gas burner, the deflection member being movable between a first position where it guides, when the gas burner and the radiant member are in their second relative position, the combustion fumes towards the gridiron, and a second position where, when the radiant element and the burner are in their first relative position, the fumes are discharged for the most part without passing through the gridiron.

The gas burner is suitably of the blue flame type, in contradistinction to a radiant gas burner.

BRIEF DESCRIPTION OF THE DRAWINGS

Other characteristics and advantages will appear from the following description of a particular embodiment of the invention. This description is given with reference to the attached drawings, in which:

FIG. 2 is a sectional view of the barbecue of FIG. 1;

FIG. 3 is an enlarged sectional view of a detail of FIG. 2.

DETAILED DESCRIPTION OF THE DRAWINGS

Figure 1:
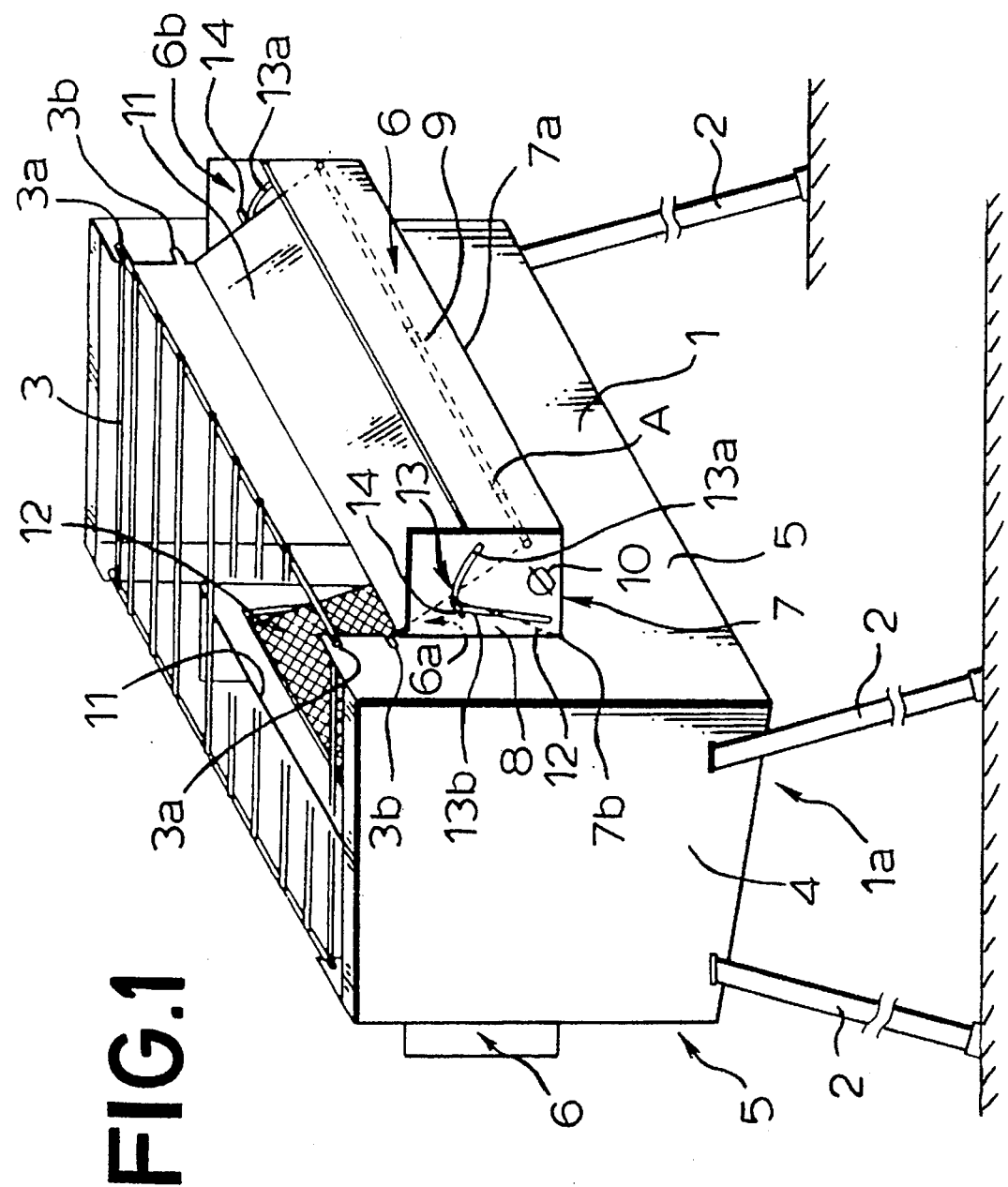
FIG. 1 is a perspective view of a barbecue according to the particular embodiment.

The barbecue shown in these figures comprises more in particular a case 1 supported by four legs 2 and closed at its top by a gridiron 3. The case 1 and the legs 2 together constitute the mounting of the gridiron 3.

The case 1 has a substantially parallelepiped shape defined by a rectangular bottom 1a from which extend two lateral sides 4 and two longitudinal sides 5.

The gridiron 3 suitably has an area of 1000 cm$^2$. Slots 3a and 3b are provided in sides 5 in order to receive the gridiron 3 in two different positions where it closes the case 1 at the part opposite the bottom 1a. The two planes which the gridiron 3 can occupy when it is fitted on the case 1 are perpendicular to the sides 4 and 5 and are displaced relative to each other.

The bottom 1a is slightly inclined relative to the above-mentioned planes of the gridiron 3, such that when—as shown in FIG. 1—the legs 2 of the barbecue are placed on flat ground, the gridiron 3 is also horizontal, the sides 4 and 5 being vertical, while the bottom 1a is slightly inclined with respect to the horizontal. Fat drips through the gridiron 3 into a fat dripping zone below the gridiron 3, which zone is defined partly by the sides 4 and 5 and the bottom 1a. The fat falls onto the bottom 1a, along which it runs to one side thereof where it accumulates.

The two longitudinal sides 5 of the case 1 each symmetrically support a compartment 6 projecting from the outside of the case 1. Each of these compartments 6 is a parallelepiped housing, open at its top and also open towards the inside of the case 1. It has a rectangular bottom 7, as well as two end faces 8 and a longitudinal side 9 extending perpendicularly from the bottom 7. The opening towards the fat dripping zone and towards the zone occupied by the gridiron 3 on the frame, which opening is formed in the compartment 6 opposite the longitudinal side 9, has been referenced 6a in the figures. The upper opening of a compartment 6 opposite its bottom 7 has been referenced 6b.

The bottoms 7 are both in the same plane, which is approximately halfway up the sides 5 and parallel to the planes of the gridiron 3 when it is in place on the frame. The bottoms 7 each extend longitudinally along the greater part of the corresponding side 5.

The height, from a bottom 7, of a longitudinal side 9 which is a continuation of the bottom 7 is less than that of the end faces 8.

In the bottom of each of these compartments 6 is a gas burner 10 of the blue flame type, which is a slit pipe burner. A burner of this type has suitably a power of 5.1 kW and is suitably fed with butane at 29 mbar or propane at 37 mbar. It extends along the whole length of its compartment 6.

In each of the compartments 6, a deflection member or deflector 11 is pivoted on the end faces 8 about an axis A. Such a deflector 11 is a rectangular flap, which, as will be described below in more detail, guides, in one of its angular positions, the combustion fumes produced by the burner 10 towards the gridiron 3. The axis A runs along one of the long edges of the deflection member 11 in the form of a flap. It is parallel to the edge 7a of intersection of the bottom 7 and the longitudinal side 9 of its compartment 6, and runs near the edge 7a, substantially above the burner 10.

The end faces 8 of a compartment 6 also support a radiant grille 12, which is suitably a rectangular grille of 190 cm$^2$ made of heat-resisting steel perforated with diamond-shaped apertures (diagonals 10 mm by 5 mm). The size of the apertures has been chosen such that the grille is sufficiently open to allow the passage of infrared radiation and at the same time offer a minimum of resistance to the natural convection of the combustion fumes.

In order to support the radiant element or grille 12, the end faces 8 of the compartment 6 each contain a continuous slot 13 having a shape defined by a portion 13a being an arc of a circle, and continued by a straight portion 13b.

One of the ends of the straight portion 13b of a slot 13 contained in such an end face 8 is situated near the edge 7b joining the bottom 7, from which extends the end face 8 and the side 5 which supports the bottom 7. This portion 13b extends from this first end towards the top of the compartment 6. It is somewhat inclined relative to side 5, its second end being displaced relative to the first, towards the longitudinal side 9 of the compartment 6.

This second end is also one of the ends of the arc portion 13a. This portion 13a is substantially centred on a point on the end face 8 in which it is provided, near the first end of the portion 13b which is a continuation of it. The first portion 13a extends thus from the zone occupied by the gas burner 10 towards the fat dripping zone, and the second portion extends from the first portion 13a towards the bottom 7 of the compartment 6.

The grille 12 supported by the end faces 8 of a compartment 6 has guiding elements in the form of two coaxial pins 14 projecting from either side of two opposite lateral edges of the grille. The two pins 14 are located near one of the long edges of the grille 12, parallel to said edge. Each pin engages the corresponding slot 13 of the compartment 6.

The grille 12 also has two pins 15, which are likewise coaxial and located near the longitudinal edge of the grille 12 which is opposite the pins 14, the common axis of these two pins 15 being parallel to the common axis of the two pins 14. The portion of the grille 12 to which the pins 15 are attached is, in all the positions of the grille 12, outside the compartment 6 and inside the case 1, said pins 15 resting against the inner face of the side 5 which supports the compartment 6.

The pins 14 are free to slide in the slots 13 which receive them.

When the pins 14 of a radiant grille 12 are positioned in the arc portions 13a of the end faces 8 of their compartment 6, the grille 12 is within the compartment 6, from the axis defined by the pins 14. The pins 15 extend in an axis which is near the edge 7b and rest against the interior face of the portions of the side 5 on either side of the opening 6a.

When the pins 14 reach the straight portion 13b, said pins 14 can then slide towards the bottom of the compartment 6. When the pins 14 butt against the ends of the straight portions 13b opposite the arc portions 13a, the radiant grille 12 supported by them is then within the case 1, along the wall 5, substantially below its compartment 6.

The end faces 8 of a compartment 6 each also have an internal pin 16 projecting perpendicularly from their inner face and situated near the plane of the side 5 of the compartment 6, opposite the bottom 7 of this compartment. The two pins 16 of a same compartment 6 are coaxial. The pivoted deflector 11 in this compartment 6 rests either on the longitudinal edge of the grille 12, towards which the pins 14 of the grille 12 are disposed when they are in the arc portions 13a, or on the pins 16 of the compartment 6 when the pins 14 have slid down the straight portions 13b.

A barbecue of this type is used in the manner described below.

The essential advantage of such a barbecue is to allow a user to choose the cooking mode he desires. With the same barbecue he can cook either by radiant heat, by convective heat, or by a combination of the two.

When the pins 14 of a grille 12 have reached the ends of the portions 13a of the slots 13 which are opposite to the portions 13b, the grille 12 is in its first position near the burner 10 of its compartment 6, whereas the deflector 11 is in its second or raised position in which it is near the longitudinal side 9 of its compartment 6 and frees the opening 6b of the compartment 6. The fumes emitted by the burner 10 escape for the most part, as is indicated schematically in FIG. 3 by the arrow F, through the apertures in the grille 12 and through the opening 6b, without passing through the gridiron 3.

In this arrangement, the radiant grille 12 utilizes the energy emitted by the burner 10. Its orientation is such that the radiant grille 12 radiates through the opening 6a in the direction of the gridiron 3.

In this way, the food is cooked mainly by radiation.

To change to the combined convection/radiation mode, or to the entirely convection mode, the operator moves the pins 14 in the slots 13. By moving the pins 14 in the arc portion 13a, the operator pivots the radiant grille towards the fat dripping zone. The deflector flap 11 then pivots by its own weight into its first position in which it closes the upper fume discharge opening 6b. Thus, the combustion fumes are returned by the deflector 11 through the plurality of apertures in the grille 12 made of heat-resistant material, towards the gridiron 3 where they heat the food by convection. The radiant grille 12 is now in its second position from the burner 10 and so emits less radiant energy than when it is in its first position where it is opposite the burner 10.

The food is thus cooked by a combination of radiation and convection, the proportion of radiation energy relative to convection energy being adjustable by the position of the pins 14 with respect to the arc portions 13a.

If the operator now slides the pins 14 so that they fall to the end of the straight portions 13b, the radiant grille 12 will fall into the case 1, in its retracted position shown by a dotted line in FIG. 3, where it is in the portion of the case which is below the compartment 6, to one side of the fat dripping zone. The deflector 11 then rests against the pins 16 and closes the compartment 6.

Thus, all the fumes emitted by the burner 10 are directed towards the gridiron 3. The radiant grille 12 is no longer heated and so does not radiate.

Cooking is now entirely by convection.

Thus, by progressively closing the upper opening of the compartments 6 by the deflectors 11, the heat exchange is altered progressively from pure radiation to pure convection, all intermediate settings being, of course, possible.

It will have been noted that in all the cases where the deflector 11 closes the fume discharge opening 6b, the angle made by this deflector 11 with the gridiron 3 supporting the food is less than 90 degrees. Thus, the combustion fumes suitably spread beneath the grille, without escaping straight past the edges thereof.

Of course, the position of a grille 12 and deflector 11 in one compartment 6 may be adjusted independently of the grille and deflector in the other compartment, which allows the operator to carry out two types of cooking simultaneously on the same barbecue.

What is claimed is:

1. A barbecue comprising, on the one hand, a gridiron (3) to receive the food to be cooked, and, on the other hand, means (10, 11, 12) for cooking said food, these cooking means including a gas burner (10) and at least one radiant element (12) which is arranged laterally with respect to the fat dripping zone, said radiant element (12) being oriented such as to radiate towards said gridiron (3) wherein the cooking means comprise at least one gas burner (10) of the blue flame type, as well as at least one deflection member (11) adapted to guide the combustion fumes emitted by the gas burner, the gas burner (10) and/or the radiant element (12) being movable between a first relative position where they are opposite each other and where the radiant element (12) is active and a second position where the radiant element (12) is remote from the gas burner (10), the deflection member (11) being movable between a first position where it guides, when the gas burner (10) and the radiant element (12) are in their second relative position, the combustion fumes towards the gridiron (3), and a second position where, when the radiant element (12) and the burner (10) are in their first relative position, the fumes are discharged for the most part without passing through the gridiron (3).

2. The barbecue according to claim 1 wherein the gas burner (10) is situated in the bottom (7) of a compartment (6) disposed laterally with respect to the fat dripping zone, said compartment (6) having, on the one hand, a lateral opening (6a) towards the gridiron (3) and, on the other hand, an upper opening (6b) for the escape of the combustion fumes, the radiant element (12) being movable relative to the compartment (6) between a first position where it is near the burner (10), and where it is interposed between the burner (10) and the gridiron (3), and a second position where it is rocked towards the fat dripping zone, the deflection member (11) being a flap which, according as to whether it is in its first position or its second position, either shuts off the greater part of the upper fume discharge opening (6b) formed by the compartment (6) or does not shut it off.

3. The barbecue according to claim 2 wherein the flap (11) forming the deflection member is pivotally hinged in the compartment (6) about an axis (A) which extends relative to the zone occupied by, on the one hand, the gas burner (10) and, on the other hand, the radiant element (12) in its first position, to one side of this zone which is opposite to the fat dripping zone, the flap (11) being in its second position against the radiant element (12) occupying its first position in said compartment (6), said flap (11) rocking into its first position when the radiant element (12) rocks from its first position to its second position.

4. The barbecue according to claim 3 wherein the radiant element (12) is a grille of heat-resisting material comprising a plurality of apertures for the passage of combustion fumes.

5. The barbecue according to claim 1 wherein in the second relative position of the gas burner (10) and the radiant element (12), said radiant element (12) is retracted with respect to said gas burner (10) and does not radiate.

6. The barbecue according to claim 2 wherein in the second relative position of the gas burner (10) and the radiant element (12), said radiant element (12) is retracted with respect to said gas burner (10) and does not radiate.

7. The barbecue according to claim 3 wherein in the second relative position of the gas burner (10) and the radiant element (12), said radiant element (12) is retracted with respect to said gas burner (10) and does not radiate.

8. The barbecue according to claim 4 wherein in the second relative position of the gas burner (10) and the radiant element (12), said radiant element (12) is retracted with respect to said gas burner (10) and does not radiate.

9. The barbecue according to claim 5 wherein in its second position the radiant element (12) is retracted beneath the compartment (6), laterally with respect to the fat dripping zone.

10. The barbecue according to claim 6 wherein in its second position the radiant element (12) is retracted beneath the compartment (6), laterally with respect to the fat dripping zone.

11. The barbecue according to claim 7 wherein in its second position the radiant element (12) is retracted beneath the compartment (6), laterally with respect to the fat dripping zone.

12. The barbecue according to claim 8 wherein in its second position the radiant element (12) is retracted beneath the compartment (6), laterally with respect to the fat dripping zone.

13. The barbecue according to claim 5 wherein the gas burner (10) and the radiant element (12) allow at least one relative position which is an intermediate position between their first and second positions, the radiant element (12) in this intermediate position being heated by the gas burner (10), but radiating more weakly than when the radiant element (12) and the gas burner (10) are in their first relative position.

14. The barbecue according to claim 9 wherein the gas burner (10) and the radiant element (12) allow at least one relative position which is an intermediate position between their first and second positions, the radiant element (12) in this intermediate position being heated by the gas burner (10), but radiating more weakly than when the radiant element (12) and the gas burner (10) are in their first relative position.

15. The barbecue according to claim 2 wherein the radiant element (12) is supported by means which comprise two guiding slots (13) formed in two end faces (8) respectively in front of the compartment (6), these means also comprising two additional guiding elements (14) projecting from the radiant element (12), each of these two projecting elements (14) sliding in the corresponding guiding slot (13) to allow the radiant element (12) to pass from one position to the other.

16. The barbecue according to claim 13 wherein each guiding slot (13) has a first portion (13a) extending from the zone occupied by the gas burner (10) towards the fat dripping zone and a second portion (13b) extending from said first portion towards the bottom (7) of the compartment (6), the radiant element (12) passing from its first position to its intermediate position and back again by the sliding of its guiding elements (14) projecting into the first portions (13a) of the guiding slots (13), and passing from its intermediate position to its second position by the sliding of its guiding elements (14) projecting into the second portions (13b) of the guiding slots (13).

17. The barbecue according to claim 15 wherein each guiding slot (13) has a first portion (13a) extending from the zone occupied by the gas burner (10) towards the fat dripping zone and a second portion (13b) extending from said first portion towards the bottom (7) of the compartment (6), the radiant element (12) passing from its first position to its intermediate position and back again by the sliding of its guiding elements (14) projecting into the first portions (13a) of the guiding slots (13), and passing from its intermediate position to its second position by the sliding of its guiding elements (14) projecting into the second portions (13b) of the guiding slots (13).

18. The barbecue according to claim 1 wherein the cooking means are arranged on either side of the fat dripping zone.

19. The barbecue according to claim 5 wherein the cooking means are arranged on either side of the fat dripping zone.

20. The barbecue according to claim 13 wherein the cooking means are arranged on either side of the fat dripping zone.

* * * * *